United States Patent
Ok et al.

(10) Patent No.: US 6,293,425 B1
(45) Date of Patent: Sep. 25, 2001

(54) SYSTEM FOR DISPENSING COPPERPLATES FOR IMPRINTING CAPTIONS ON A FILM IN A CAPTION PRINTER

(75) Inventors: Sung Il Ok, Kawacheon; Min Sub Yun, Seoul, both of (KR)

(73) Assignee: Tae Eun Goo (KR)

( * ) Notice: Subject to any disclaimer, the term of this patent is extended or adjusted under 35 U.S.C. 154(b) by 0 days.

(21) Appl. No.: 09/586,256

(22) Filed: May 31, 2000

(30) Foreign Application Priority Data

Jun. 1, 1999 (KR) .................................................. 99-20049

(51) Int. Cl.⁷ ........................................................ G07F 11/00
(52) U.S. Cl. .............................................. 221/75; 221/287
(58) Field of Search ........................................ 221/75, 287

(56) References Cited

U.S. PATENT DOCUMENTS

| | | | |
|---|---|---|---|
| 4,600,119 | * 7/1986 | Olson | 221/75 |
| 5,356,333 | * 10/1994 | Bointon et al. | 221/75 X |
| 5,649,641 | * 7/1997 | Campoli | 221/287 X |

* cited by examiner

Primary Examiner—David H. Bollinger
(74) Attorney, Agent, or Firm—Martine & Penilla, LLP

(57) ABSTRACT

Disclosed is a system capable of automatically dispensing copperplates one by one in sequence to be used in imprinting captions on a film in a caption printer. The system has a casing shaped as a slim tube having an inclined guiding hole. A coil spring is longitudinally inserted in the casing. Each of the copperplates can be received in each of pitches of the casing. A rotation shaft is fixed to a lower end of the coil spring. The copperplates can be inserted through the upper end of the casing and guided into each of the pitches one by one in sequence while the rotation shaft together with the coil spring is rotated. The copperplates can be dispensed out of the casing through the inclined guiding hole one by one in sequence at each rotation of the coil spring.

4 Claims, 4 Drawing Sheets

SYSTEM FOR DISPENSING COPPERPLATES FOR IMPRINTING CAPTIONS ON A FILM IN A CAPTION PRINTER

BACKGROUND OF THE INVENTION

1. Field of the Invention

The present invention relates to a caption printer, and more particularly to a system capable of automatically dispensing copperplates one by one in sequence to be used in imprinting captions on a film in a caption printer.

2. Description of the Related Art

According to a conventional method for imprinting captions on a film for motion pictures, movies, etc., a flexible film is pressed on a copperplate on which a desired caption is embossed, so that the caption is imprinted on the film.

In a conventional caption printer using the conventional method, the copperplate is placed on a stand, and a film drawn out from a winding roll on which the film is wound is positioned above the copperplate. Also, a pressing plate of an actuator moving down from above presses the film onto the copperplate, so that the caption is imprinted on the lower surface of the film.

The copperplates are drawn out from a supplying casing and placed onto the stand one by one, and are put one by one into a storing casing after being used in imprinting a caption on a film.

In such a case as above in which the copperplates are drawn out and stored one by one by a worker's manual operation, it takes considerable time and expense in supplying and storing the copperplates. This problem deteriorates the efficiency of the labor and the competence of the caption printer in the market. Moreover, the manual operation of drawing out and storing the copperplates disturbs a complete automation of the caption printer. Also, the productivity is not increased in the prior art.

SUMMARY OF THE INVENTION

Accordingly, the present invention has been made in an effort to solve the problems occurring in the related art, and it is an object of the present invention to provide a system for dispensing copperplates for imprinting captions on a film in a caption printer, in which the copperplates stored in pitches of a coil spring are automatically dispensed by a driving force of a motor, thereby achieving a complete automation in imprinting captions on a film, and reducing time and labor spent in imprinting captions on the film.

In accordance with one aspect, the present invention provides a system for dispensing copperplates for imprinting captions on a film in a caption printer, the system comprising:

a casing shaped as a slim tube whose upper end is open, the casing having an inclined guiding hole extending through a lower portion of the casing in an inclined direction;

a coil spring longitudinally inserted in the casing, the coil spring being wound in such a manner as to have a plurality of pitches between turns of the coil spring, in each of which can be received each of the copperplates; and a rotation shaft fixed to a lower end of the coil spring so as to rotate the coil spring, wherein the copperplates can be inserted through the upper end of the casing and guided into each of the pitches one by one in sequence while the rotation shaft together with the coil spring is rotated, and the copperplates can be dispensed out of the casing through the inclined guiding hole one by one in sequence at each rotation of the coil spring.

Preferably, the system further has a supporting plate installed at a front position of the caption printer, a supporting bracket fixed on the supporting plate, a rotating plate received in the supporting bracket, and a motor for rotating the rotating plate. A lower end of the casing is fitted in the supporting bracket, and the rotating plate has a center shaft assembled with the rotation shaft in the supporting bracket, so that the rotation shaft is rotated by a driving force of the motor.

More preferably, the rotation shaft and the rotating plate respectively have first and second engaging pins which are engaged with each other, so that a rotational force of the rotating plate by the motor is transferred through the first and the second engaging pins to the rotation shaft. The coil spring may be a spiral spring in which a rectangular metal wire is wound in a spiral shape.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
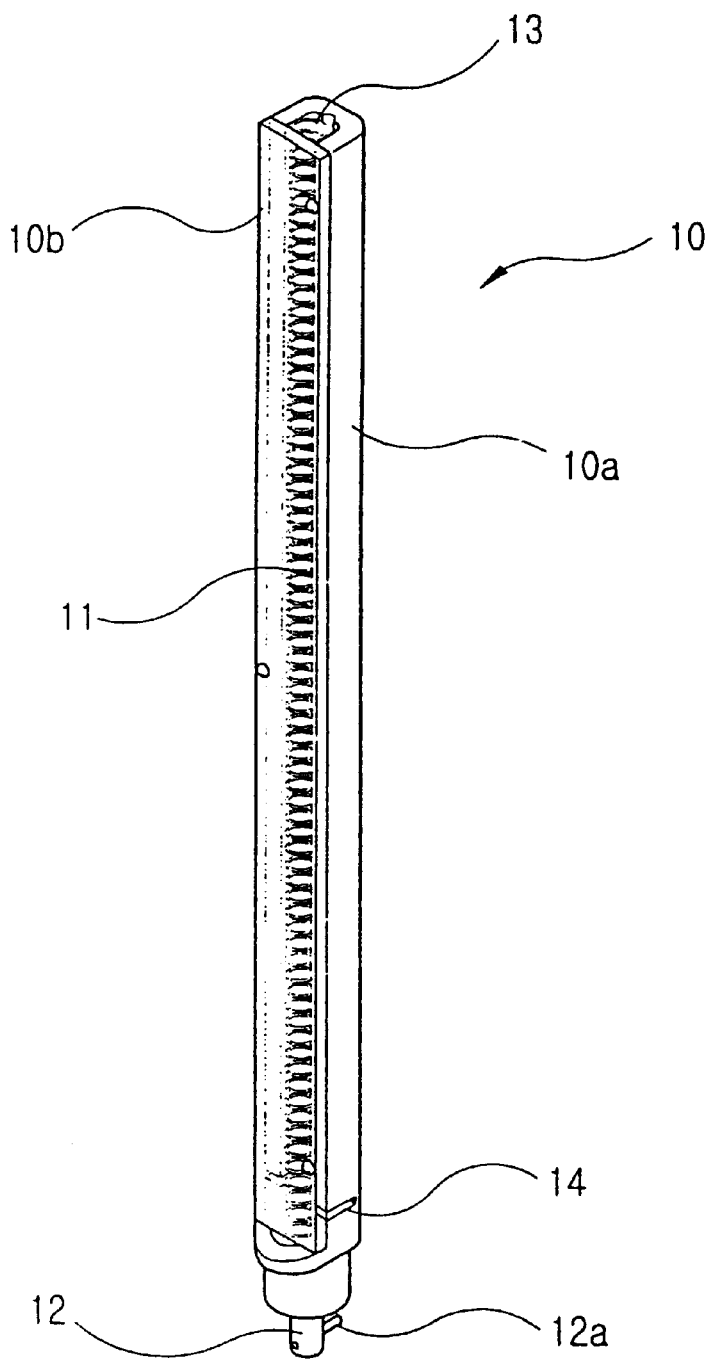
FIG. 1 is a perspective view of a system for dispensing copperplates for imprinting captions on a film in a caption printer according to a preferred embodiment of the present invention.

Hereinafter, described in detail will be a system for dispensing copperplates for imprinting captions on a film in a caption printer according to a preferred embodiment of the present invention, with reference to the accompanying drawings.

As shown in FIGS. 1 to 4, the system of the present invention includes a supporting bracket 21 disposed on a supporting plate 20 which is fixed at a front position of a caption printer 1. The supporting bracket 21 has an open upper end and contains a rotating plate 22 which is rotated by a motor 23.

The rotating plate 22 has a shaft protruding downward under the supporting bracket 21 and being connected through a belt and pulleys to the motor 23 to be rotated by the motor 23. Preferably, the motor 23 is a stepping motor capable of rotating the rotating plate 22 intermittently by one revolution.

In the supporting bracket 21 is detachably inserted a lower end of a casing 10 having a shape of a slim tube. A rotation shaft 12 for rotating a coil spring 11 protrudes downward from the bottom of the casing 10 to be engaged with the rotating plate 22 of the supporting bracket 21.

That is, the rotation shaft 12 and the rotating plate 22 respectively have first and second engaging pins 12a and 22a, which are engaged with each other, so that the driving force from the motor 23 is transferred through the rotating plate 22 to the rotation shaft 12. The present invention may employ any of a variety of types of mechanisms for transferring the driving force from the rotating plate 22 to the rotation shaft 12, instead of the first and second engaging pins 12a and 22a as shown.

The casing 10 includes a frame 10a having a U-shape section and a transparent plate 10b attached to the open front surface of the frame 10a. The coil spring 11 is longitudinally inserted in the inner space of the casing 10 defined between the frame 10a and the transparent plate 10b. The lower end of the coil spring 11 is fixed to the upper end of the rotation shaft 12 inserted through the bottom of the casing 10.

The coil spring 11 is a spiral spring in which a rectangular metal wire is wound in a spiral shape. A plurality of copperplates can be stored in the coil spring 11 in such a manner that each copperplate is inserted in each pitch between adjacent two winding turns of the coil spring 11.

A supplying port 13 through which the copperplates 30 are inserted into the casing 10 is formed at the top of the casing 10, and an inclined guiding hole 14 for dispensing the copperplates 30 one by one from the casing 10 is formed at a lower part of the casing 10. The inclined guiding hole 14 has an inclination corresponding to the winding inclination of the coil spring 11.

In the casing 10 of the present invention having the above construction, the copperplates 30 respectively having desired captions embossed thereon are inserted in the pitches of the coil spring 11 in sequence according to the order of the captions to be imprinted on the film.

In this case, the copperplates 30 are inserted through the supplying port 13 into the casing 10 while the rotation shaft 12 is rotated, and then the copperplates 30 are received one by one in each pitch of the coil spring 11 owing to its rotation. If necessary, instead of the above process, the copperplates 30 may be simultaneously inserted in every pitch after the transparent plate 10b is removed, and then the transparent plate 10b is attached again. That is, it is optional which method to select for inserting the copperplates 30 in the casing 10.

After the copperplates 30 are inserted in the casing 10 as above, the lower end of the casing 10 is engaged in the supporting bracket 21 and a switch is powered on, then the casing 10 intermittently experiences one revolution according to a program inputted in a control section (not shown).

In this case, the rotating plate 22 received in the supporting bracket 21, which is connected through a belt and pulleys to the motor 23, and the rotation shaft 12 and the coil spring 11 engaged with the rotating plate 22 through the first and second engaging pins 12a and 22a altogether experience one revolution, also.

Whenever the coil spring 11 experiences one revolution, the copperplate 30 in the lowest pitch is dispensed while the others of the copperplates 30 in the pitches of the coil spring 11 go down by one pitch. When the copperplate 30 in the lowest pitch reaches the inclined guiding hole 14 of the casing 10, the copperplate 30 slides through and is dispensed out of the inclined guiding hole 14. The dispensed copperplate 30 is carried along guide rails 40 to a copperplate supplying system, and then to the imprinting location under a pressing plate and a film, so that a caption is imprinted on the film.

Figure 2:
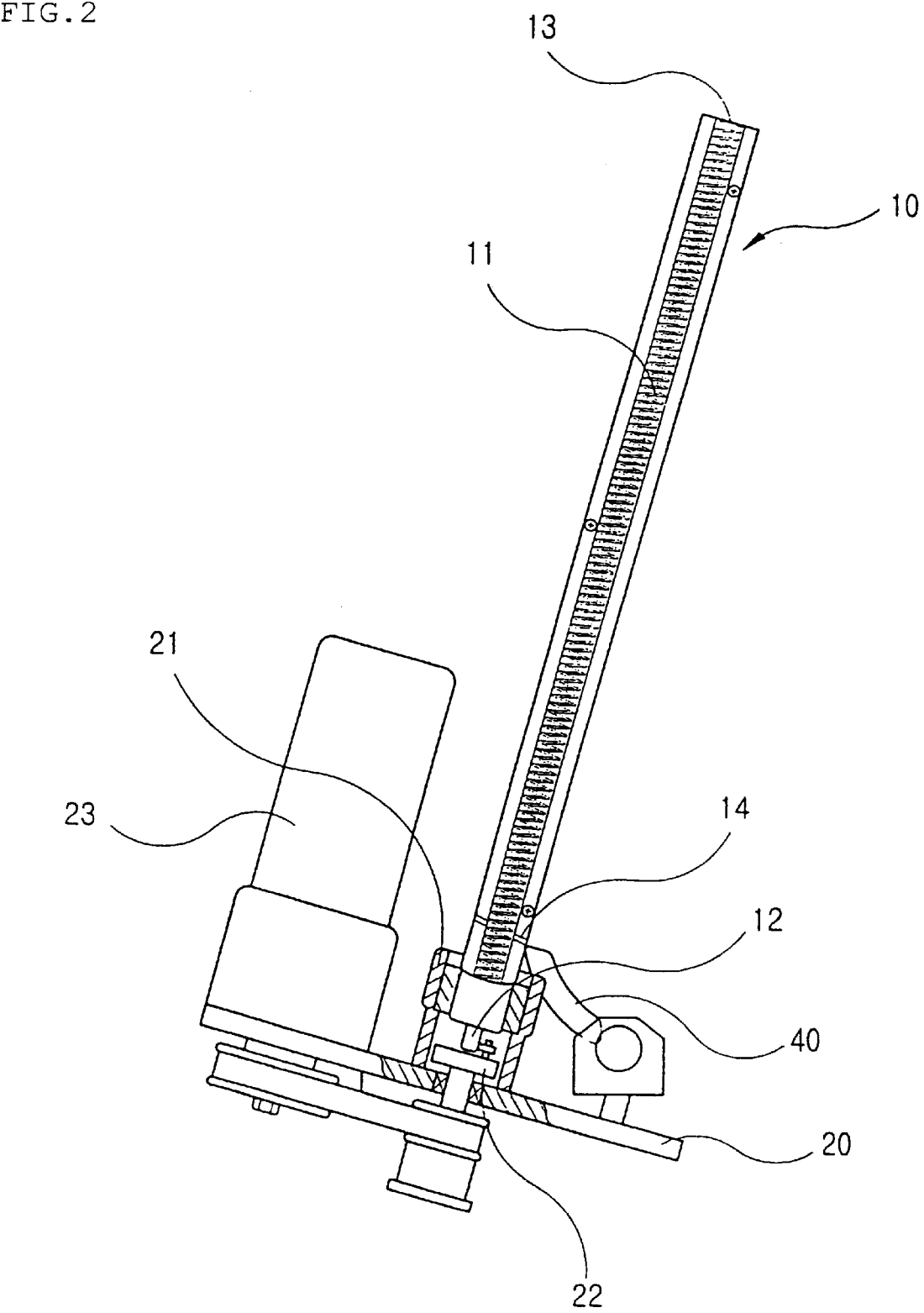
FIG. 2 is a partly cut-out side elevation in which the system shown in FIG. 1a is fitted in a supporting bracket on a supporting plate of the caption printer.
Figure 3:
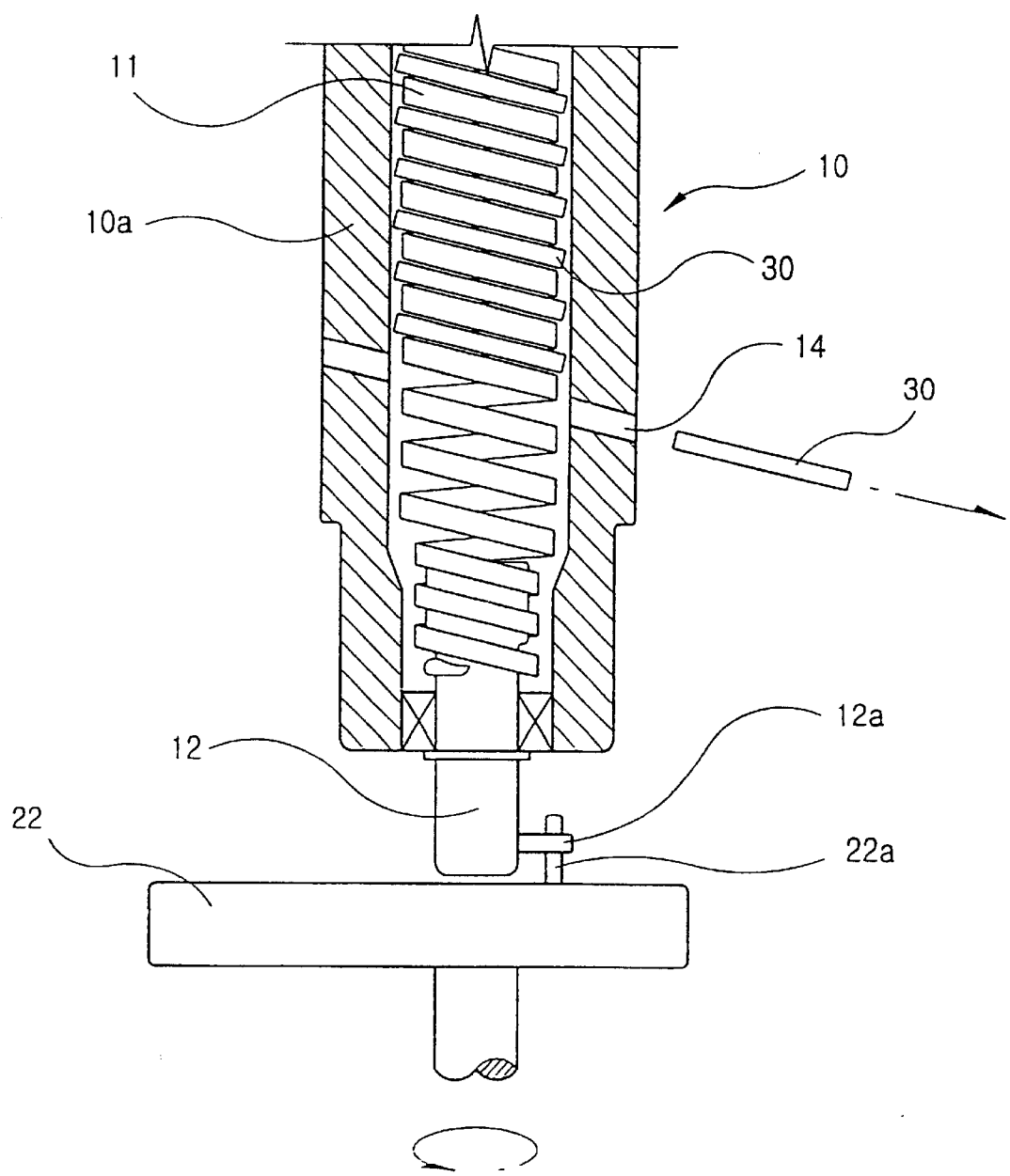
FIG. 3 is an enlarged sectional view of a part of the system shown in FIG. 1.
Figure 4:
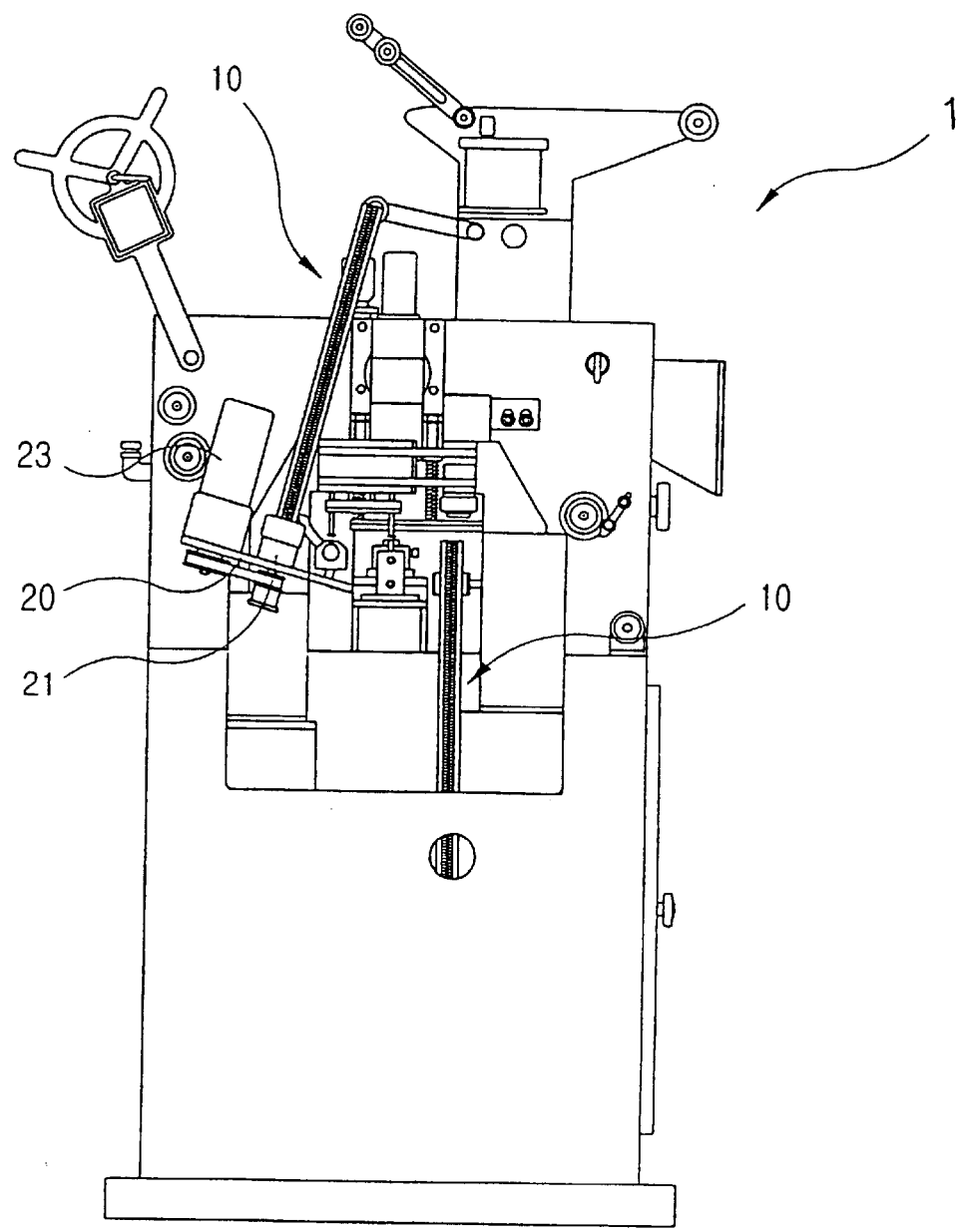
FIG. 4 is a side elevation of a caption printer in which the casings as shown in FIG. 1 are installed.

Meanwhile, in the case where the supporting bracket 21 and the casing 10 are installed in such a manner as to be inclined toward the inclined guiding hole 14 as shown in FIG. 2, the inclination of the inclined guiding hole 14 is further increased, so that the copperplates 30 may more easily slide through the inclined guiding hole 14 and may be more easily dispensed out of the inclined guiding hole 14. This increase of inclination highly increases convenience in dispensing the copperplates 30.

In the meantime, when the imprinting of the film has been completed, the system is ready to dispense another copperplate 30 out of the casing 10. That is, the motor 23 is ready to make the coil spring 11 experience another one revolution to dispense another copperplate out through the inclined guiding hole 14.

As described above, the copperplates 30 are dispensed one by one in sequence at each revolution of the coil spring 11 according to the programmed order from the control section, in the system of the present invention. Therefore, the present invention realizes an entirely automated caption printer 1, which considerably reduces the expense and maximizes the productivity in imprinting captions on a film. In other words, the present invention provides an automated copperplate dispensing system employed in a caption printer competent in the market, which has overcome the problems of the prior art.

According to the copperplate dispensing system of the invention, the copperplates 30 once used in imprinting the caption can be automatically stored in sequence in the casing 10 again.

That is, the caption printer 1 may further include a motor and a supporting bracket installed after the imprinting position in the working flow of the caption printer 1. Moreover, another empty casing 10 is assembled in the supporting bracket 21 in the same way as above. Then, the copperplates 30 used in the imprinting task are carried to and put into the supplying port 13 of the casing 10, and then are inserted one by one in each pitch of the coil spring 11 rotated by the motor. Through the reiteration of this process, all the copperplates 30 may be stored in the casing 10 after being used in imprinting.

The casing 10 containing the used copperplate 30 through the process as above may be used again in dispensing the copperplates 30 to be used in imprinting captions on another film. Therefore, a necessity for a separate casing for storing the used copperplates is eliminated.

As described above in detail, in the copperplate dispensing system of the present invention, the copperplates 30 inserted in the pitches of the coil spring 11 are automatically dispensed through the inclined guiding hole 14 of the casing 10, whenever the rotating plate 22 is intermittently rotated one revolution by the motor 23 according to the program previously inputted in the control section. Thereafter, the copperplates 30 are carried one by one to the imprinting position under the pressing plate and the film, and then the caption imprinting is performed.

Therefore, the present invention realizes an entirely automated caption printer 1, which considerably reduces the expense and maximizes the productivity in imprinting captions on a film. In other words, the present invention provides an automated copperplate dispensing system employed in a caption printer competent in the market, which has overcome the problems of the prior art.

While there has been illustrated and described what is considered to be a preferred specific embodiment of the present invention, it will be understood by those skilled in the art that the present invention is not limited to the specific embodiment thereof, and various changes and modifications and equivalents may be substituted for elements thereof without departing from the true scope of the present invention.

What is claimed is:

1. A system for dispensing copperplates for imprinting captions on a film in a caption printer, the system comprising:
- a casing shaped as a slim tube whose upper end is open, the casing having an inclined guiding hole extending through a lower portion of the casing in an inclined direction;
- a coil spring longitudinally inserted in the casing, the coil spring being wound in such a manner as to have a plurality of pitches between turns of the coil spring, in each of which can be received each of the copperplates; and
- a rotation shaft fixed to a lower end of the coil spring so as to rotate the coil spring,
- wherein the copperplates can be inserted through the upper end of the casing and guided into each of the pitches one by one in sequence while the rotation shaft together with the coil spring is rotated, and the copperplates can be dispensed out of the casing through the inclined guiding hole one by one in sequence at each rotation of the coil spring.

2. A system as claimed in claim 1, the system further comprising a supporting plate installed at a front position of the caption printer, a supporting bracket fixed on the supporting plate, a rotating plate received in the supporting bracket, and a motor for rotating the rotating plate, a lower end of the casing being fitted in the supporting bracket, the rotating plate having a center shaft assembled with the rotation shaft in the supporting bracket, so that the rotation shaft is rotated by a driving force of the motor.

3. A system as claimed in claim 2, wherein the rotation shaft and the rotating plate respectively comprise first and second engaging pins which are engaged with each other, so that a rotational force of the rotating plate by the motor is transferred through the first and the second engaging pins to the rotation shaft.

4. A system as claimed in claim 1, wherein the coil spring is a spiral spring in which a rectangular metal wire is wound in a spiral shape.

* * * * *